United States Patent
Jacobs

(10) Patent No.: US 10,070,740 B2
(45) Date of Patent: Sep. 11, 2018

(54) ADJUSTABLE FASTENER

(71) Applicant: John Jacobs, Landover, MD (US)

(72) Inventor: John Jacobs, Landover, MD (US)

(*) Notice: Subject to any disclaimer, the term of this patent is extended or adjusted under 35 U.S.C. 154(b) by 0 days.

(21) Appl. No.: 14/932,188

(22) Filed: Nov. 4, 2015

(65) Prior Publication Data

US 2017/0119181 A1     May 4, 2017

(51) Int. Cl.
*A47G 1/16* (2006.01)
*A47G 1/20* (2006.01)

(52) U.S. Cl.
CPC ............. *A47G 1/164* (2013.01); *A47G 1/202* (2013.01)

(58) Field of Classification Search
CPC .... A47G 1/1606; A47G 1/1613; A47G 1/162; A47G 1/1626; A47G 1/1633; A47G 1/164; A47G 1/20; A47G 1/202; A47G 1/205; A47G 1/21; A47G 2001/207; Y10T 24/141; Y10T 24/1498
USPC .... 248/466, 470, 475.1, 476, 477, 478, 480, 248/489, 490, 493, 494, 495, 496, 497, 248/498, 221.11, 222.11, 295.11, 297.31, 248/301, 304, 307, 308, 323, 327, 339; 40/745, 748, 757, 759; D8/354, 355, D8/367; 24/16 PB, 17 AP
See application file for complete search history.

(56) References Cited

U.S. PATENT DOCUMENTS

| | | | | |
|---|---|---|---|---|
| 545,774 A * | 9/1895 | Clark | ........................ | F16L 3/14 248/59 |
| 3,855,669 A * | 12/1974 | Meyer | ................ | B65D 63/1072 24/16 PB |
| 3,900,923 A * | 8/1975 | Thomas | ............. | B65D 63/1072 24/16 PB |
| 4,223,864 A * | 9/1980 | Harlow | ................ | A47G 1/1646 248/490 |
| 4,557,455 A * | 12/1985 | Benjamin | .......... | B65D 63/1072 24/16 PB |
| 4,727,630 A * | 3/1988 | Alan | ...................... | A44B 11/06 24/593.11 |
| 5,687,455 A * | 11/1997 | Alexander | ......... | B65D 63/1072 24/16 PB |
| 5,967,341 A * | 10/1999 | Werner | ................. | A47F 5/0884 211/71.01 |
| D607,310 S * | 1/2010 | Williams | ...................... | D8/367 |
| 8,807,502 B2 * | 8/2014 | Bixler | .................... | A47G 1/164 248/295.11 |
| 8,899,541 B2 * | 12/2014 | Bixler | .................... | A47G 1/164 248/295.11 |

(Continued)

*Primary Examiner* — Jonathan Liu
*Assistant Examiner* — Guang H Guan
(74) *Attorney, Agent, or Firm* — Nath, Goldberg & Meyer; Joshua B. Goldberg; James Lafave

(57) ABSTRACT

An adjustable fastener is provided. The adjustable fastener includes an elongated main body and a mounting bracket for receiving the main body therein. The elongated main body includes a plurality of teeth along the length of the main body. The mounting bracket includes a latching mechanism disposed on a front face thereof, the latching mechanism having a first end including a release lever and a second end including a plurality of ribs extending into an interior volume of the mounting bracket. The ribs on the second end of the latching mechanism engage with the teeth on the main body to slidably secure the main body within the mounting bracket, thereby providing a vertically adjustable fastener.

7 Claims, 4 Drawing Sheets

(56) References Cited

U.S. PATENT DOCUMENTS

| | | | | |
|---|---|---|---|---|
| 9,370,267 B2* | 6/2016 | Greve | ............... | A47G 1/164 |
| 2009/0294616 A1* | 12/2009 | Eriksson-Bradley | ............... | A47G 1/202 248/305 |
| 2012/0241583 A1* | 9/2012 | Potgieter | ............... | A47G 1/202 248/475.1 |
| 2015/0272353 A1* | 10/2015 | Christodoulou | ............... | A47G 1/202 29/525.01 |
| 2017/0119181 A1* | 5/2017 | Jacobs | ............... | A47G 1/202 |

* cited by examiner

ADJUSTABLE FASTENER

FIELD

The present subject matter relates to adjustable wall hanging devices and more particularly relates to an adjustable fastener for adjustably suspending an object from a wall.

BACKGROUND INFORMATION

A variety of wall hanging devices have been previously designed for the purpose of hanging picture frames and other items on walls and other vertical surfaces. Standard picture hangers typically are formed pieces of metal mounted to a wall by one or more nails and that include some sort of hook on which a picture frame is supported. Typically, a wire extending across the rear side of a picture frame is supported by the picture hanger's hook.

One common problem associated with such standard picture hangers is the difficult task of positioning the picture hanger on the wall at an appropriate location such that the picture to be mounted thereon is located at the exact, desired location. Mounting a picture hanger too high or too low of the desired location, even by a fraction of an inch, leads to the undesirable task of remounting the picture hanger itself, this time at a different location on the wall. Such remounting is wasteful, time consuming and results in the creation of unnecessary holes in the wall. These additional, unnecessary holes are aesthetically undesirable, may result in reduced wall strength, and ultimately need to be repaired. Still further, an already mounted picture frame may later need to be remounted as a result of shifting of walls which often occurs after a newly constructed structure has settled.

Adjustable fasteners have several advantages over conventional picture hangars. Adjustable fasteners can alleviate the "trial-and-error" approach of conventional fasteners that often unnecessarily results in multiple, unused punctures in the wall. Despite the advantages of adjustable fasteners over conventional fasteners, adjustable fasteners often have complex designs and are limited in adjustability. This is due, at least in part, to the fact that many adjustable fasteners include multiple components that require tools to manipulate the orientation of the fastener. In addition, it can be difficult for a user to locate or grasp the adjustable fastener when attached to a picture. Based on the foregoing, there is a need for an adjustable fastener which allows a user to easily and readily adjust the height of an object with minimal steps.

BRIEF SUMMARY

In view of the foregoing disadvantages inherent in the known types of adjustable fasteners devices now present, the present subject matter provides a new adjustable fastener which provides for vertical adjustability of a hanging object.

The adjustable fastener of the present subject matter simplifies the process of installing a wall hanging, including paintings, on a wall in many different ways. First, it provides a method for establishing the exact location for the support hardware that must be installed on the wall. Second, it provides a method for adjusting the vertical orientation of the wall hanging on the wall without having to remove the wall hanging, or support hardware, or use any tools. Third, it provides a method for levelling and adjusting the orientation of a wall hanging quickly and easily without having to remove the wall hanging, or support hardware, or using any tools.

According to one embodiment, the adjustable fastener includes an elongated main body having a plurality of teeth and a mounting bracket for receiving the main body therein. The mounting bracket is securable to a vertical surface with mounting fasteners such as screws, nails, or other similar fasteners. The mounting bracket includes a latching mechanism disposed on a front face of the mounting bracket. The latching mechanism has a first end including a release lever and a second end including a plurality of ribs. The ribs extend into the interior volume of the mounting bracket. The main body is slidably attached to the mounting bracket such that the ribs on the second end of the latching mechanism engage with the plurality of teeth on the main body at a desired height to secure the main body within the mounting bracket.

In yet another embodiment of the present subject matter, the adjustable fastener comprises an elongated T-shaped main body having a plurality of teeth, wherein a distal end of the main body comprises an upwardly-facing transverse groove. The adjustable fastener further includes a mounting bracket for receiving the main body therein. The mounting bracket comprises a latching mechanism disposed on a front face thereof, the latching mechanism having a first end including a release lever and a second end including a plurality of ribs extending into an interior volume of the mounting bracket. The release lever on the first end rests above the plane of the front face of the mounting bracket and the ribs on the second end rest below the plane of the front face of the mounting bracket such that the ribs on the second end of the bracket engage with the teeth on the main body to slidably secure the main body within the mounting bracket. In one embodiment, the T-shaped main body is designed to independently accept a picture hanging cable or wire in the center thereof. The T-shape is designed to support the cable or wire in such a way as to maintain the picture in a horizontal or vertical orientation.

Other objects, features and advantages of the present subject matter will become apparent from the following detailed description taken in conjunction with the accompanying drawings.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

This present subject matter provides an apparatus for adjustably securing paintings, pictures, or other wall hangings to a wall or vertical support. In one embodiment, the adjustable picture fastener provides a method to install a painting or picture on a wall and allows a user to adjust the orientation of the wall hanging or picture easily and quickly. Specifically, adjusting the orientation of the adjustable fastener does not require tools to manipulate the height of the wall hanging, nor is it overly complex or expensive.

Figure 1:
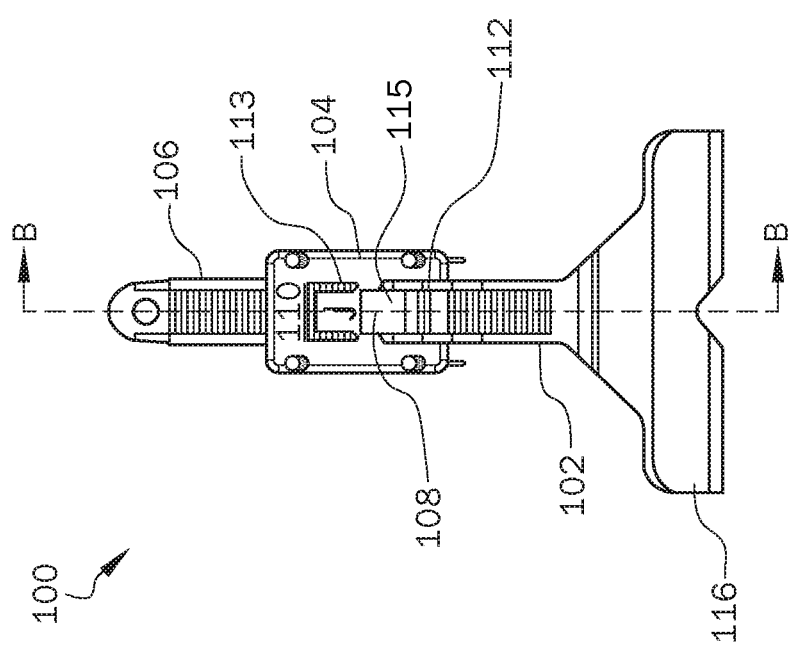
FIG. 1 is a front view of the adjustable picture fastener, according to at least one embodiment.
Figure 2:
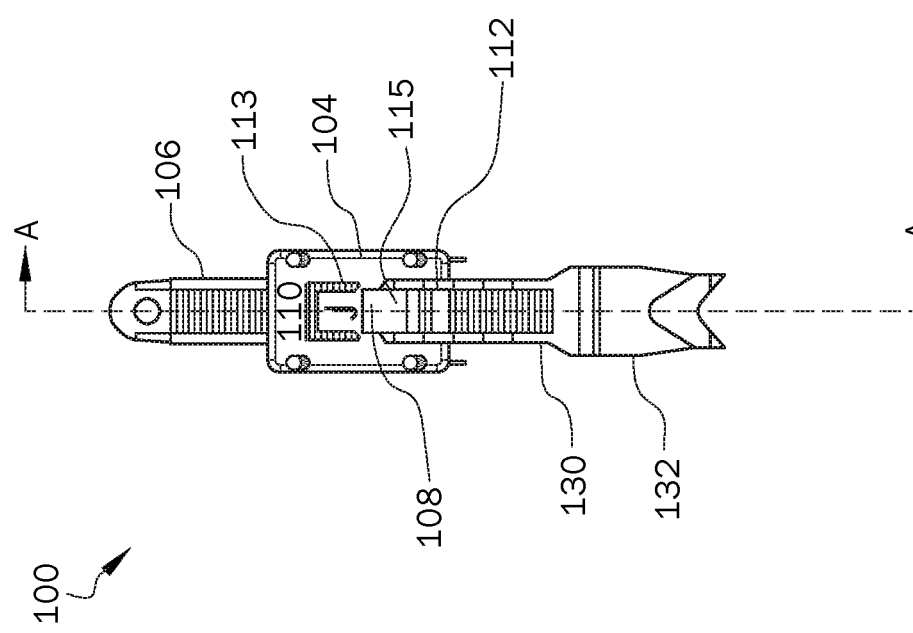
FIG. 2 is a front view of the adjustable picture fastener according to one or more embodiments.

Referring to the drawings in detail, wherein like numerals indicate like elements throughout several views, FIGS. 1 and 2 show frontal views of the adjustable picture fastener according to various embodiments. As shown in FIGS. 1 and 2, the adjustable picture fastener 100 comprises a pair of components which may be assembled as a single unit, namely a mounting bracket 104 that is securable to a vertical surface with fasteners, and an elongated main body 102, 130. The elongated main body 102, 130 includes a plurality of teeth 106 extending along the length of the main body 102, 130. The teeth 106 on the main body 102, 130 are spaced at equidistant intervals, wherein each groove may be a downwardly facing transverse groove. The distal end of the main body 102, 130 comprises an upwardly-facing transverse groove 116, 132. The upwardly-facing transverse groove 116, 132 is configured to receive a picture frame hanging cable or wire thereon. However, the adjustable fastener 100 is not limited to only attaching objects to a wall, but allows for the adjustable attachment of any two, separate items by providing more than one hooking means.

According to these embodiments, the main body 102, 130 is slidably attached within the interior volume of the mounting bracket 104. The mounting bracket 104 comprises at least two apertures for securing the bracket 104 to a vertical surface with fasteners. The mounting bracket 104 includes a latching mechanism 108 disposed on a front face 110 thereof. The latching mechanism 108 has a first end including a release lever 112, a second end including a tab 113, and an intermediate portion 115 connecting the first end and the second end. The tab 113 extends into the interior volume of the mounting bracket 104, below the plane of the front face 110 of the mounting bracket 104. In this way, the tab 113 is capable of contacting the main body 102, 130. The tab 113 comprises a plurality of ribs which engage with the teeth 106 on the main body 102, 130 to provide a secure mechanical connection.

The main body 102, 130 and the mounting bracket 104 can be manufactured out of the same structural polymeric material, e.g., thermoplastics such as polyvinyl carbonate or nylon. This polymeric material is strong and flexible, and tolerates the weight of pictures of different sizes. In one embodiment, the elongated main body 102, 130 comprising the polymeric material is about 6" long and about ¾" wide and is made with a series of teeth on one side, and a ⅛" diameter hole on an end opposing the upwardly facing transverse groove 116, 132. In some embodiments, the hole is configured to receive a #10 screw which attaches to an anchor if extra support is necessary. Other dimensions for the elongated main body and the hole on one end are further contemplated herein. The upwardly facing transverse groove 116 can be a U-shaped bevel that is configured to receive a cable or wire. In other embodiments, the upwardly facing transverse groove 132 is designed to accommodate a standard D-ring hook that can be attached to a picture frame. It is contemplated that numerous hooking means can be provided on the distal end of the main body 102, 130.

Figure 3:
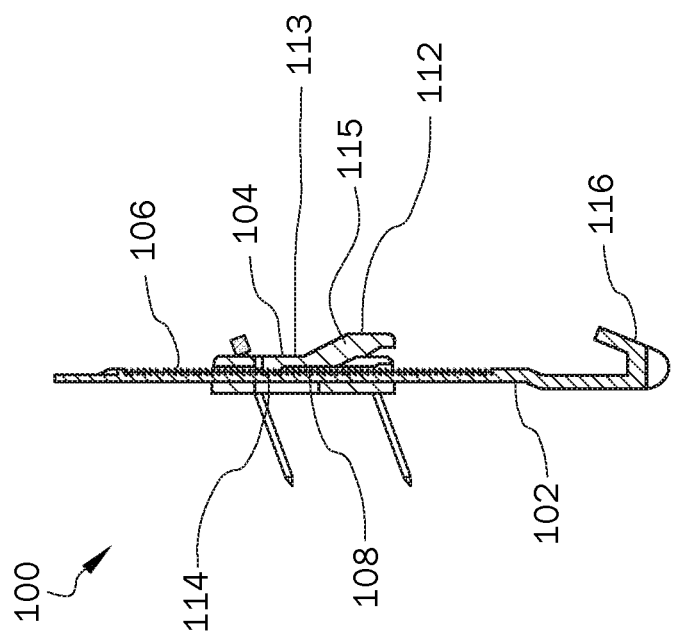
FIG. 3 is a side perspective view of the adjustable picture fastener mounted to a wall surface, according to another embodiment.

FIG. 3 illustrates a side perspective view of the adjustable fastener system mounted to a wall surface. According to this embodiment, the mounting bracket 104 includes at least two, or four, mounting apertures 120 disposed on the front face of the mounting bracket 104. The mounting bracket 104 is secured to a surface by one or more fasteners that are received in the mounting apertures 120, such as nails or the like. The nails may be specifically designed to minimize wall damage. The mounting apertures 120 slope downwardly from the front face 110 of the mounting bracket 104 to a rear face of the mounting bracket 104. In this way, the fasteners enter the mounting bracket 104 in a sloped downward angle to reinforce the mounting bracket 104 against the attached surface. The mounting bracket 104 is a static component of the adjustable fastener 100 that is secured to a wall surface and the main body 102 is the dynamic component that moves within the interior volume of the mounting bracket 104.

FIG. 3 further illustrates the interlocking portions of the mounting bracket 104 and the main body 102. In this configuration, the teeth 106 that are on the main body 102 are now permitted to engage the latch mechanism 108 within the mounting bracket 104 of the adjustable fastener 100. The latch mechanism 108 has a plurality of ribs 114 that serve as a lock element that engages the teeth 106 and prevents movement in the opposite direction. This lock element can be released to allow adjustment, which can be accomplished without any tools and without removing the picture from the wall. The number, shape and size of the teeth may be specifically designed to carry the intended weight and may be selected based on a particular need of a project, e.g., precision for an adjustment, picture weight, etc.

Figure 4B:
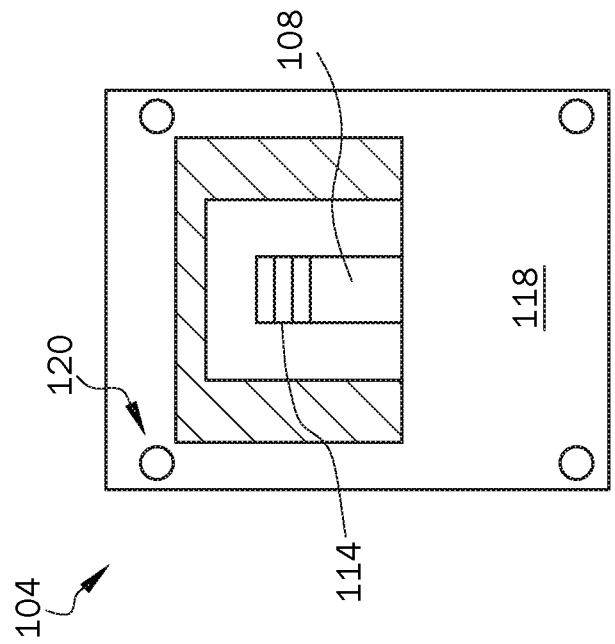
FIGS. 4A-B are front and rear views of the mounting bracket, respectively, according to at least one embodiment.
Figure 4A:
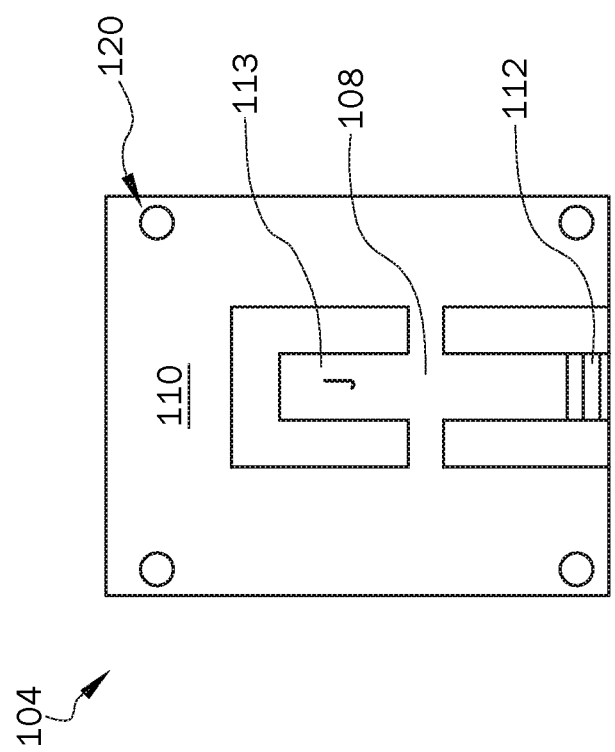

FIGS. 4A-B show front and rear views of the mounting bracket, respectively, according to at least one embodiment. The mounting bracket 104 includes four mounting apertures 120 that are configured to receive fasteners to secure the adjustable fastener to a surface. As shown in FIG. 4A, the mounting bracket 104 includes a front face 110 and an opposing rear face 118 (FIG. 4B) that define an interior volume of the mounting bracket 104. The interior volume of the mounting bracket 104 provides a track for receiving the main body therein. The rear face 118 is preferably planar or flat and is preferably in flush engagement with a surface and directly contacts the surface when the mounting bracket 104 is attached to the desired surface.

The front face 110 of the mounting bracket opposes the rear face 118 and includes a latching mechanism 108. The latching mechanism 108 includes a release lever 112 on a first end and a tab 113 including a plurality of ribs 114 on a second end. The ribs 114 on the tab portion 113 of the latching mechanism 108 comprise upwardly facing transverse teeth that correspond with the downwardly facing transverse teeth on the main body 102, 130. The release lever 112 and the intermediate portion 115 are configured to move toward the main body 102, 130 when the release lever 112 is depressed to disengage the ribs 114 on the tab portion 113 of the latching mechanism from the teeth of the main body 102, 130.

In one embodiment, the release lever 112 on the first end of the latching mechanism 108 rests above the plane of the front face 110 of the mounting bracket 104. On the second end of the latching mechanism 108, the ribs 114 rest below the plane of the front face 110 of the mounting bracket such that the ribs extend into the interior volume of the mounting bracket 104. The release lever 112 is configured to move the ribs 114 on the second end in an up and down direction. The ribs 114 of the bracket 104 engage with the teeth 106 on the main body 102, 130 to slidably secure the main body within the mounting bracket. The release lever 112 enables a user to move the main body 102 within the mounting bracket 104 to adjust the height the fastener.

In use, the mounting bracket 104 can be secured to a surface and the main body 102, 130 can be subsequently inserted into an interior volume of the mounting bracket 104. Upon insertion of the main body 102, 130 into the mounting bracket 104, the ribs 114 of the latching mechanism 108 engage with teeth 106 on the main body 102, 130. A user can depress the release lever 112 to disengage the ribs 114 of the latching mechanism from the teeth 106 on the main body 102, 130. Subsequently, a user can move the main body 102, 130 within the mounting bracket 104 to a desired height for the item to be hung. Once the desired height for the main body 102, 130 is determined, the release lever 112 is engaged to lock the ribs 114 within the teeth 106 on the main body, thereby preventing the main body 102 from moving. Finally, a picture frame hanging cable or wire can be placed in the upwardly-facing transverse groove 116, 132 on the distal end of the main body 102, 130.

The embodiments of the subject matter are particularly adapted for hanging pictures and may be installed in pairs for larger pictures. This allows for easy adjustment of the paintings vertical location on the wall without requiring removal of the picture from the wall. The adjustable fastener also allows for quick and easy levelling of a picture and for paintings to be removed from the wall with minimum damage to the wall surface.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. An adjustable fastener, comprising:
    an elongated main body having a plurality of teeth; and
    a mounting bracket for receiving the main body therein through an entire length of the mounting bracket, the mounting bracket comprising a latching mechanism disposed on a front face thereof, the latching mechanism having a first end including a release lever, a second end including a plurality of ribs extending into an interior volume of the mounting bracket, and an intermediate portion connecting the first end and the second end;
    a transverse groove located at a distal end of the main body;
    wherein the ribs of the second end of the latching mechanism engage with the teeth of the main body to slidably secure the main body within the mounting bracket;
    wherein the transverse groove has a length greater than a width of the main body; and
    wherein the mounting bracket comprises two or more mounting apertures, the two or more mounting apertures slope downwardly from the front face of the mounting bracket to a rear face of the mounting bracket;
    wherein a front face of the second end of the latching mechanism is coplanar with the front face of the mounting bracket;
    wherein the intermediate portion slopes outwardly and downwardly from the second end;
    wherein the release lever extends from the intermediate portion, the entire release lever is oriented substantially vertically and offset from a plane of the front face of the mounting bracket, and the release lever and the intermediate portion are configured to move toward the main body when the release lever is depressed to disengage the ribs of the second end of the latching mechanism from the teeth of the main body.

2. The adjustable fastener of claim 1, wherein the transverse groove is configured to hang a picture from a cable or a wire to maintain the picture in a level orientation.

3. The adjustable fastener of claim 1, wherein the mounting bracket is securable to a vertical surface with two or more mounting fasteners passing through the two or more mounting apertures of the mounting bracket.

4. The adjustable fastener of claim 1, wherein the ribs of the second end of the latching mechanism are locked in the teeth of the main body when the release lever is static.

5. The adjustable fastener of claim 1, wherein the main body and the mounting bracket are fabricated from a structural polymeric material.

6. The adjustable fastener of claim 1, wherein the teeth of the main body are downwardly facing transverse teeth.

7. The adjustable fastener of claim 6, wherein the ribs of the second end of the latching mechanism are upwardly facing transverse teeth that correspond with the teeth of the main body.

\* \* \* \* \*

UNITED STATES PATENT AND TRADEMARK OFFICE
CERTIFICATE OF CORRECTION

PATENT NO. : 10,070,740 B2  
APPLICATION NO. : 14/932188  
DATED : September 11, 2018  
INVENTOR(S) : John Jacobs Page 1 of 1

It is certified that error appears in the above-identified patent and that said Letters Patent is hereby corrected as shown below:

On the Title Page

Item (72), amend the city of the Inventor from "Landover, MD" and replace with "Silver Spring, MD"

Signed and Sealed this  
Twenty-eighth Day of May, 2019

Andrei Iancu  
*Director of the United States Patent and Trademark Office*